Figure 1:
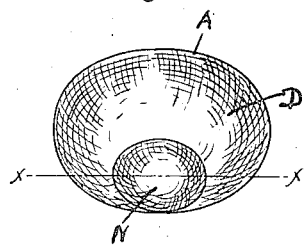

A. KINNEAR.
PROCESS FOR FORMING A BIFOCAL LENS.
APPLICATION FILED JAN. 2, 1915.

1,165,978. Patented Dec. 28, 1915.

Witnesses
Inventor
Alexander Kinnear
by Robt. B. Wilson
Attorney

UNITED STATES PATENT OFFICE.

ALEXANDER KINNEAR, OF TOLEDO, OHIO.

PROCESS FOR FORMING A BIFOCAL LENS.

1,165,978.

Specification of Letters Patent.

Patented Dec. 28, 1915.

Application filed January 2, 1915. Serial No. 80.

*To all whom it may concern:*

Be it known that I, ALEXANDER KINNEAR, a citizen of the United States, residing at Toledo, in the county of Lucas and State of Ohio, have invented new and useful Improvements in Processes for Forming a Bifocal Lens, of which the following is a specification.

My invention relates to a blank for a bi-focal lens and the process for forming the same, and has for its object to provide a blank of the kind that is adapted to be formed into a finished bi-focal lens with a minimum amount of grinding, and wherein the near and smaller field is integral with the larger and distance field and is formed of a different kind of glass.

I accomplish these objects by forming a bi-focal lens blank as hereinafter described and illustrated in the drawings, in which—

Figure 2:
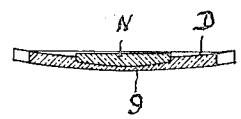
Figure 3:
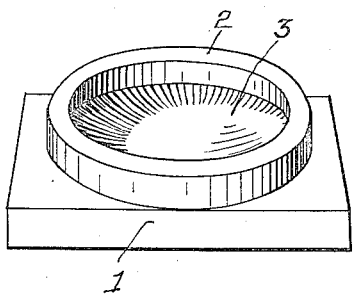
Figure 4:
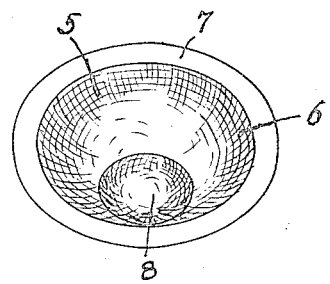
Figure 5:
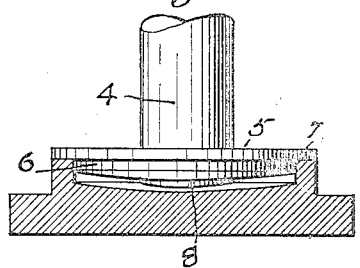

Figure 1 is a side view of a blank constructed in accordance with my invention. Fig. 2 is a section of the same on line $x$—$x$ of Fig. 1. Fig. 3 is a perspective top view of a mold for forming the main or distance field of the blank. Fig. 4 is a bottom end view of a plunger for the mold adapted to form a cavity in the material of the distance field to receive the material for the near field, and concave the distance field, of a blank. Fig. 5 is a sectional view of the mold with the plunger in position therein to complete the formation of the distance field of the blank.

In the drawings 1 designates a mold having an elliptical wall 2 and a concave bottom 3, and 4 designates a plunger having a head 5 provided with a former 6, adapted to telescopically enter the cavity of the mold, and having a flange portion 7 adapted to engage the top of the wall 2 and limit the distance of entrance of the former 6. The former 6 is provided with a spheroidal projection 8 adapted to form a cavity 9 for the near field of the blank in the plastic glass deposited within the mold for forming the distance field D, of a blank A formed in the mold.

To form a blank in the mold 1, a quantity of molten glass sufficient to form the distance field D of the blank A is placed in the mold, thus constructed, and the former 6 of the plunger head 5 is inserted into the mold until the flange 7 rests on the top of the wall 2 and is then withdrawn, which operation forms the field D concavo-convex and also forms the cavity 9 to receive the near field N. The inner surface of the cavity 9 is then heated by a blow pipe to soften the surface and clear up any chill of the surface produced by the plunger, after which a globule of molten crown glass is dropped into the cavity 9, which spreads outward from the center to the wall of the cavity in such manner that all air is expelled from the cavity as the globule spreads to a level therein and unites integrally with the wall of the cavity, the bottom of which gives a true sphero-convexity to one side of the field N that differs from the degree of convexity of the outer or lower side of the field D that is formed by the bottom of the mold 1, and forms the equivalent of a refracting convex surface within the field D. The faces of the blank A thus constructed, it is apparent require only to be ground to remove the chill of the mold and polished to clearness to form the field D, and the field D being ground concave and polished on the concave side of the field D the lens is completed by grinding the edges of the field D to a finished size and shape for use. By this process of forming a blank for a bi-focal lens herein described I greatly reduce the time, labor and expense of producing a finished bi-focal lens.

The lenses produced from the blanks as formed may be varied as to their foci by grinding the fields to different degrees of concavo-convexity than is formed in the blank, or they may be so varied by providing a series of graduated molds and plungers therefor, each mold adapted to produce blanks having special foci. However, a preferred application of my process is to provide a limited series of molds and plungers therefor graduated to produce, each, one of a series of progressive standard degrees of concavo-convexity, from which may be formed in the grinding variations as required from each standard degree.

What I claim to be new is—

1. The method of forming a bi-focal lens which consists in forming a blank for the main field by compressing molten glass of one kind in a mold having a matrix member and a plunger member adapted to form in the matrix member a primary lens of near finished size having a sphero-convex surface and a cavity for a secondary lens within the primary lens, said cavity having a concave surface differing in focal length from the convex surface of the primary lens, re-heating the concave surface of the cavity to soften and clear it, dropping a globule of molten glass of another kind in the cavity adapted to fill the cavity when it has flattened out, grinding and polishing the surfaces of the blank thus formed and forming the edges to the desired contour of the finished lens.

2. The method of forming a bi-focal lens which consists in forming a blank for the main field by compressing molten flint glass in a mold having a matrix provided with a wall of near size and shape of a desired lens and provided with a concave bottom and a plunger member having a convex projection of the size and shape of the desired secondary lens, and adapted to form a cavity therefor in the primary lens, re-heating the concave surface of the cavity with a blow pipe, dropping a globule of molten crown glass in the cavity while so heated, said globule adapted to fill the cavity when it has flattened out therein by gravity, grinding and polishing the surfaces of the blank thus formed and forming the edges thereof to the desired contour of the finished lens.

In testimony whereof I have hereunto set my hand at Toledo, Ohio, this 28th day of December, 1914, in the presence of two subscribing witnesses.

ALEXANDER KINNEAR.

In presence of—
ALBERT T. GOORLEY,
W. H. JEFFERY.